No. 699,551. Patented May 6, 1902.
W. S. McKINNEY.
REDUCING MECHANISM.
(Application filed July 26, 1901.)
(No Model.) 2 Sheets—Sheet 2.
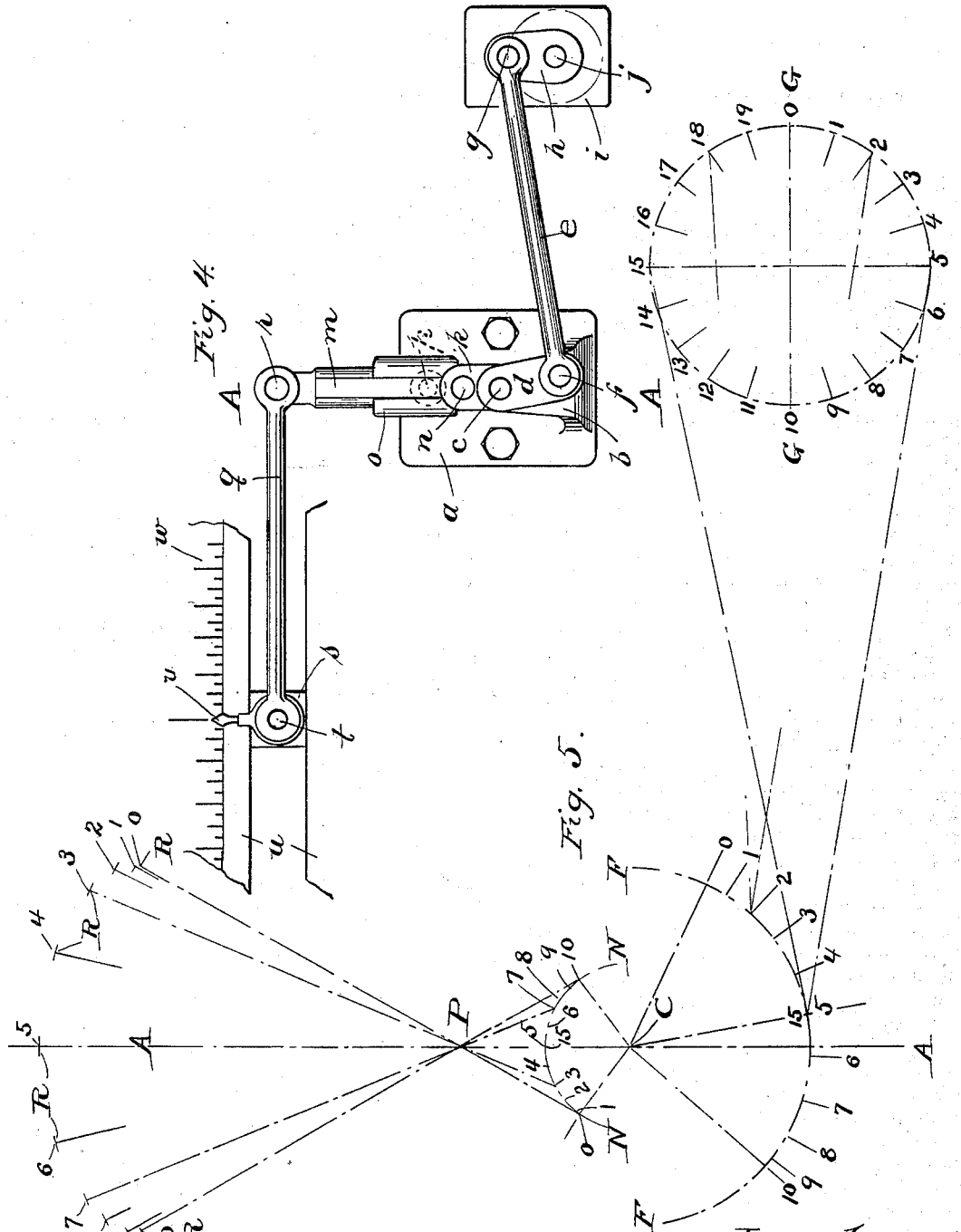
Witnesses.
Charles L. Herrick
Harry B. White
Inventor:
Walter S. McKinney
By Jesse & H. M. Cox.
Attorneys.

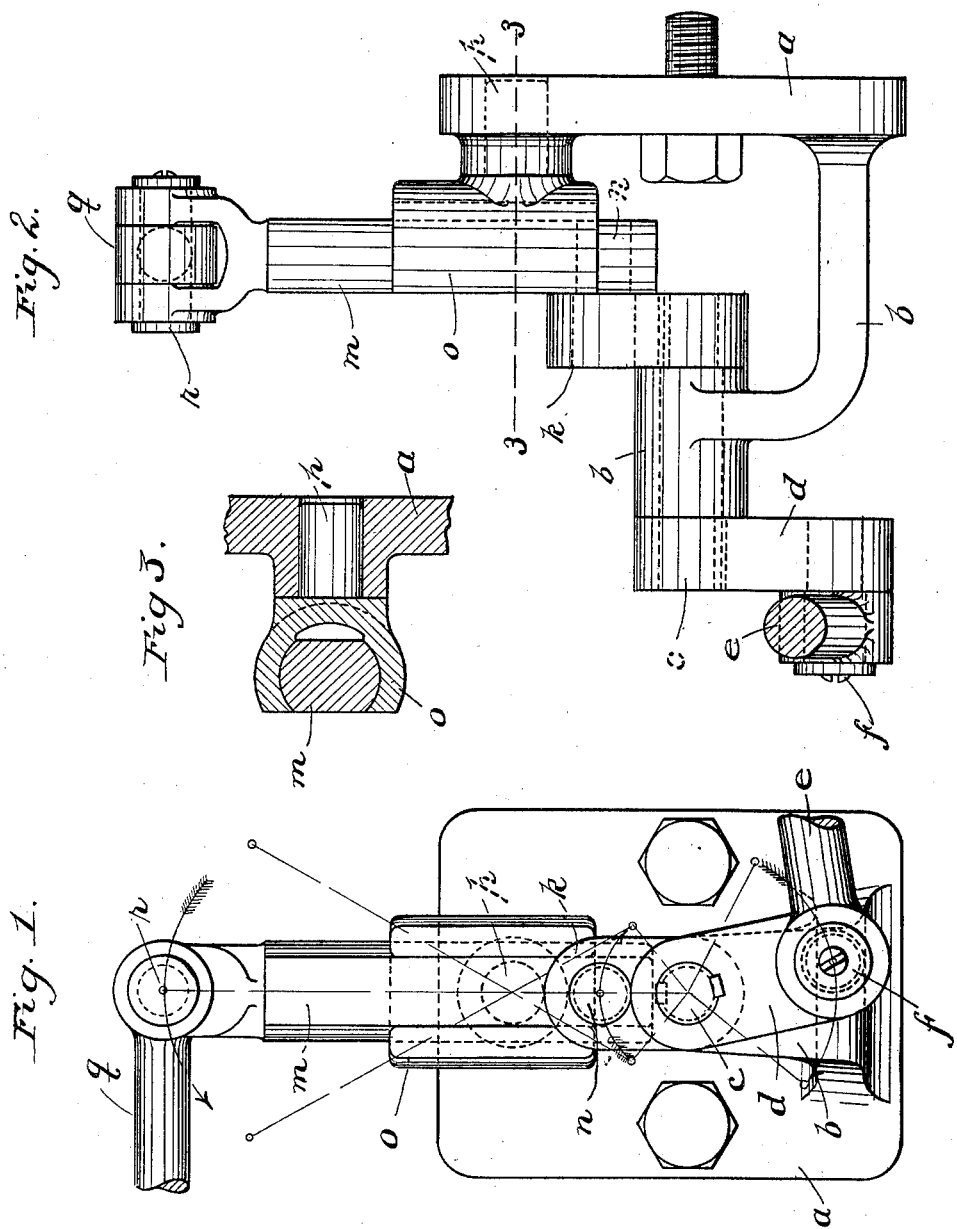

UNITED STATES PATENT OFFICE.

WALTER SABIN McKINNEY, OF CHICAGO, ILLINOIS.

REDUCING MECHANISM.

SPECIFICATION forming part of Letters Patent No. 699,551, dated May 6, 1902.

Application filed July 26, 1901. Serial No. 69,802. (No model.)

*To all whom it may concern:*

Be it known that I, WALTER SABIN MCKINNEY, a citizen of the United States, residing in the city of Chicago, county of Cook, and State of Illinois, have invented a new and useful Improvement in Reducing Mechanism, of which the following is a specification.

In various classes of machinery in which one moving part is employed to impart motion to a second moving part it is frequently desirable that the character of motion of said second or driven part shall be different from the character of motion of the first or driving part.

My present invention relates to reducing mechanism whereby the character of motion of a driving part is exhibited in a modified form in a driven part of a machine; and the object of my invention is to produce a dwell or period of comparative rest in a reciprocatory part of the machine when driven from a part having a constant motion. I attain this object by the mechanism illustrated in the accompanying drawings, in which—

Figure 1 is a face view of the rocking arms and levers which embody the principle features of my invention. Fig. 2 is a side view of the parts shown in Fig. 1. Fig. 3 is a sectional view taken on the line 3 3, Fig. 2. Fig. 4 is an assembly view of the complete device, and Fig. 5 is a diagrammatic view illustrating the motion of the main parts.

Similar characters refer to similar parts throughout the several views.

In the drawings, $a$ represents a bracket which is designed to be fixed to a stationary object and is provided with an extending arm or bracket $b$, wherein is journaled the rock-shaft $c$. The rocking arm $d$, which is keyed to and operates said shaft $c$, is pivotally connected at its free extremity to the connecting-rod $e$ by means of the pin $f$. Said connecting-rod is driven by means of the crank-pin $g$ on the crank $h$, as shown in Fig. 4. The bracket $i$ is also stationary and forms a bearing for the shaft $j$, whereby the crank $h$ is driven, and the parts are so connected that the rotation of the crank $j$ imparts a rocking motion to the shaft $c$. The arm $k$, which is also keyed to and driven by the rock-shaft $c$, is pivotally secured at its free extremity to the sliding lever $m$ by means of the pivot pin or shaft $n$. Said lever $m$ is slidingly mounted in the guide $o$, and by preference the contiguous bearing-surfaces of said lever and guide are cylindrical, as best shown in Fig. 3. In order to permit the oscillation or rocking of the lever $m$, said guide $o$ is provided with a stud $p$, which is journaled in the bracket $a$. The connecting-rod $q$ is pivotally attached to the lever $m$ by means of the pin $r$ and transmits motion to the reciprocating part $s$ through the agency of the pin $t$. Said part $s$ represents the last constituent element of the mechanism and in the present instance consists of a block sliding within the guides $u$. A pointer $v$ is is shown attached to said block in such a manner as to travel in front of the graduated scale $w$ for use in studying the character of the motion of said block $s$.

The operation of the mechanism will be best understood by referring to the diagram Fig. 5, wherein G G represents the circular path of the pin $g$, F F represents the path of the pin $f$, and C represents the location of the rock-shaft $c$. The path of pin $n$ is indicated by line N N, while P indicates the position of the stud $p$. The circle G G is laid off into twenty equal divisions numbered consecutively; but in order to avoid confusion a single stroke in one direction only of the block $s$ will be considered, which stroke will be accomplished by the movement of the pin $g$ from the point number "0" to point number "10." As the pins $g$ and $f$ are connected by the rod $e$ the revolution of the pin $g$ will cause the swinging of the pin $f$ through the arc F F, the numbers "0" to "10" on said arc indicating the position of said pin $f$ for each corresponding position of the pin $g$. The rocking of the pin $f$ and arm $d$ is transmitted through the rock-shaft $c$ to the arm $k$, thereby causing the pin $n$ in said arm to swing through the arc N N, whereon the successive positions of said pin $n$ are indicated by the numbers "0" to "10." Now the axis of the guide $o$ of the lever $m$ (shown at P in the diagram) is fixed, and it will be seen by reference to the diagram that the pin $n$ traveling on the arc N N lies at a greater distance from said point P when at the extreme positions "0" and "10" on said arc than when intermediate of said extreme positions. This increase in distance causes the lever *m* to be drawn downward in the guide *o* when approaching the extremities of the arc N N. As a result the lateral motion of the pin *r* may be arrested for a considerable period at the ends of the stroke of the lever *m*. For example, considering the line A A, Figs. 4 and 5, as the central position of the parts (the points "0" to "10" on the line R R indicating the positions of the pin *r* corresponding to the similarly-numbered positions of the pin *g* on the circle G G) it will be seen that point "10" on line R R is no farther removed from line A A than is point "0" thereon. This interpreted means that during one-tenth of the cycle the pin *r* has no lateral motion, and by varying the proportions of the parts there may even be a negative motion at such time—that is to say, a secondary or supplemental approach of the pin *r* toward the line A A at the ends of the stroke. The present device is so proportioned that during three-fifths of a cycle the lateral motion of the pin *r* is confined to one-sixth of its stroke. The motion of the pin *r* is transmitted in a somewhat-modified form to the block *s* by means of the connecting-rod *q*.

It is not essential that the part *s* move in a rectilinear path, as my present device is well adapted to operate a part having a curvilinear path, as shown in a companion application for Letters Patent of the United States for steam-engines filed by me on the 26th day of July, 1901, Serial No. 69,801.

It is evident that means other than those shown may be employed to cause the rocking of the arm *d*.

What I claim as new, and desire to secure by Letters Patent, is—

1. In a reducing mechanism, the combination of a pivoted guide, a lever sliding therein, a rock-shaft and an arm fixed to said rock-shaft and pivotally connected to said lever.

2. In a reducing mechanism, the combination of a rock-shaft having a fixed axis, an arm secured to said shaft, a bar pivoted to said arm, means for rocking said shaft and a guide for said bar, whereby the longitudinal axis of said bar may vary its inclination but always passes through a fixed point.

3. In a reducing mechanism, the combination of a rock-shaft, an arm keyed thereto, a bar pivoted to said arm, a guide for said bar, a second arm keyed to said rock-shaft and means for operating said second arm.

4. In a reducing mechanism, a bar pivoted at one extremity to a rocking arm and at the other extremity to a driven part of the mechanism in combination with a guide wherein said bar is slidingly mounted, said guide being revoluble upon a fixed axis.

5. In a reducing mechanism, the combination of a bar or lever pivotally and slidingly supported between its extremities, said bar or lever being connected at one end to a driven part of the device, a rocking arm pivotally connected to the other end of said bar or lever, a rock-shaft for driving said rocking arm, a second arm for driving said rock-shaft, a crank, and connections between said crank and said second arm whereby the rotation of said crank is transmitted to said second arm.

6. In a reducing mechanism, the combination of a crank, a rod connected thereto, a rock-shaft, an arm keyed to said shaft and pivoted to said rod, a second arm keyed to said shaft, a bar or lever pivoted to said second arm, a guide wherein said bar or lever is slidingly mounted, said guide having a fixed pivot, and a reciprocating driven member connected to said bar or lever.

7. In a reducing mechanism, the combination of a driven reciprocating member, a rod connected thereto, a bar or lever connected to said rod, a pivotally-supported guide for said bar or lever, a rock-shaft, an arm keyed to said shaft and pivoted to said bar or lever, and means for operating said rock-shaft.

8. In a reducing mechanism the combination of a sliding block, means for guiding said block, a connecting-rod pivoted to said block, a bar or lever pivoted to said rod, a guide wherein said bar or lever is slidingly mounted, said guide being pivoted on a fixed axis, a rock-shaft, an arm keyed to said shaft and pivoted to said bar or lever, and means for operating said rock-shaft.

9. In a reducing mechanism, the combination of a reciprocating block, guides for said block, a bar or lever, a rod connecting said bar or lever to said block, a pivoted guide wherein said bar or lever is slidingly mounted, an arm pivoted to said bar or lever, a rock-shaft keyed to said arm, a second arm keyed to said rock-shaft, a crank and a connecting-rod joining said crank to said second arm for operating the latter.

WALTER SABIN McKINNEY.

Witnesses:
ARTHUR M. COX,
CHARLES L. HERRICK.